United States Patent [19]
Warren

[11] 4,264,018
[45] Apr. 28, 1981

[54] COLLAPSING BLADDER POSITIVE EXPULSION DEVICE

[75] Inventor: Thomas C. Warren, Saratoga, Calif.

[73] Assignee: United Technologies Corporation, East Hartford, Conn.

[21] Appl. No.: 970,515

[22] Filed: Dec. 18, 1978

[51] Int. Cl.³ .............................................. B65D 35/28
[52] U.S. Cl. ................................. 222/95; 222/386.5; 220/85 B; 222/92
[58] Field of Search .................... 222/92, 94, 105, 107, 222/386.5, 95; 220/72, 85 B, 461, 460; 150/0.5; 138/26, 30

[56] References Cited

U.S. PATENT DOCUMENTS

| 2,723,779 | 11/1955 | Parker et al. ........................ 222/107 |
| 3,277,925 | 10/1966 | Sugimura ................................ 138/30 |
| 3,404,813 | 10/1978 | Waxman . | |
| 3,720,389 | 3/1973 | Bisciglia . | |
| 3,722,751 | 3/1973 | Bisciglia ................................ 222/95 |
| 3,979,025 | 9/1976 | Fredrich et al. ....................... 222/95 |
| 4,013,195 | 3/1977 | Ferris .................................... 222/95 |

FOREIGN PATENT DOCUMENTS 1414329 11/1975 United Kingdom ..................... 222/95

*Primary Examiner*—H. Grant Skaggs
*Attorney, Agent, or Firm*—Steven F. Stone

[57] ABSTRACT

Collapsing bladder positive expulsion devices are provided in which the bladder itself is configured to have areas of longitudinal stiffening such that upon the application of external pressure the bladder can be caused to collapse inwardly upon itself in a predetermined fashion without the requirement for a separate internal support structure.

12 Claims, 4 Drawing Figures

FIG. 3
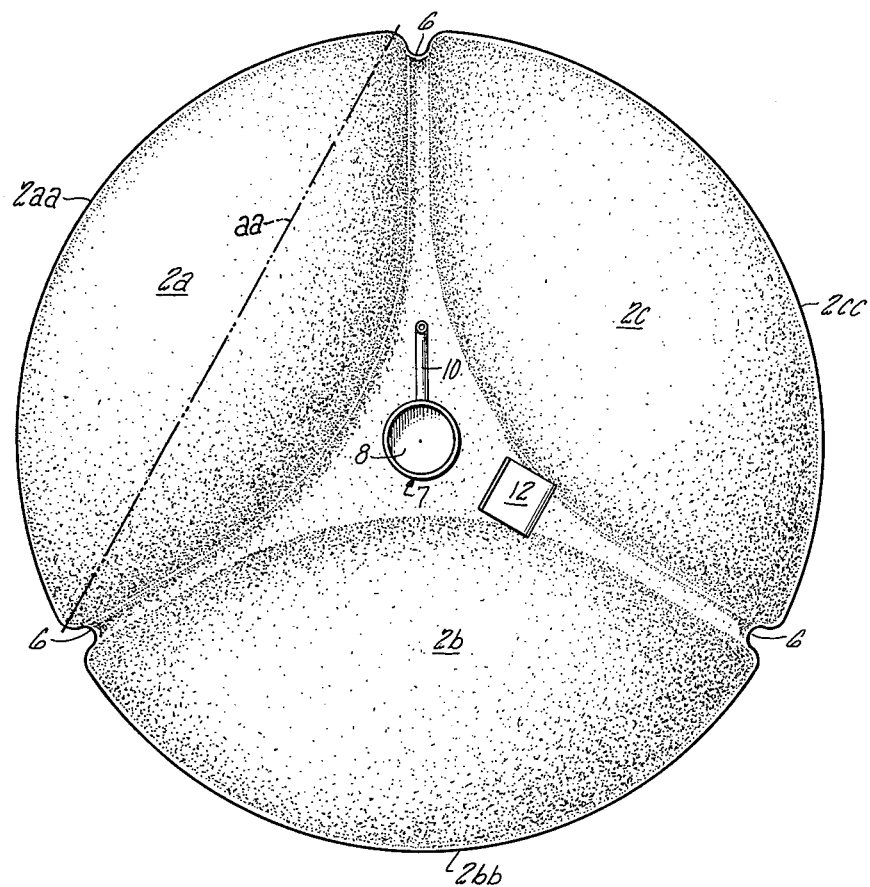
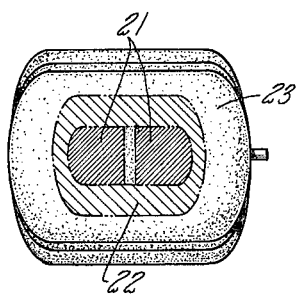
FIG. 4

COLLAPSING BLADDER POSITIVE EXPULSION DEVICE

BACKGROUND OF THE INVENTION

There are many applications in which it is necessary to be able to assure continuous flow of fluid from a container under varying conditions of acceleration, ranging from zero gravity space conditions to the high acceleration experienced in high performance aircraft and missile systems. In view of the corrosive nature of some of the materials which are normally used as fuels or oxidizers such as for example, nitrogen oxides or hudrazine, the state of the art devices generally consist of a pressure vessel containing a collapsible metallic bladder which, in turn, contains the fluid to be expelled. The bladder is caused to collapse by the application of a high-pressure gas between the inside of the pressure vessel and the outside of the bladder. In order to get maximum expulsion efficiency from such devices, it is necessary to control the collapse of the bladder in a predetermined manner to avoid, as much as possible, the development of unpredictable folds, wrinkles, or other random collapse patterns which could result in the uneven and incomplete collapse of the metallic bladder. While various approaches have been taken to this problem, one of the most promising approaches and the one to which this invention most closely relates, is the so-called three-lobed positive expulsion device, such as for example is illustrated by U.S. Pat. No. 3,404,813, Waxman, Tank With Metallic Bladder, dated Oct. 8, 1968, U.S. Pat. No. 3,720,389, Ferris, for Expulsion Bladder, dated Mar. 13, 1973, or described in the Technical Report for the Air Force Rocket Propulsion Laboratory under Contract F04611-76-C-00161, dated March, 1977, titled "Technical Report for July 19, 1976–March 19, 1976, Advanced Post-Boost Vehicle Propulsion Fuel System, AFRPLTR-77-36," particularly pages 12–39, 107–115, 124, 127–132. As can be seen from these documents, these devices consist of a pressure vessel and bladder as described above. Inside the bladder is mounted a three-lobed support structure around which the metallic bladder collapses upon the application of the pressurizing medium. The internal framework substantially increases the degree of predictability of the collapse pattern of the bladder, but even with this support structure it has been found necessary to vary the thickness of the bladder by chem milling, or otherwise as is suggested in U.S. Pat. No. 3,722,751, Bisciglia, for Control Fold Liquid Expulsion Bladder, dated Mar. 27, 1973, or shown in the AFRPL report, so that the collapse of the bladder can be initiated in predetermined areas and will propagate in a more predetermined manner. Accordingly, the collapsing bladder positive expulsion device prior art of which the inventor is aware can be fairly represented as utilizing a combination of separate internal support frameworks and a variable thickness bladders to produce positive expulsion devices having high degrees of expulsion efficiency. While such devices work reasonably well, there are certain problems associated with the use of the internal support structures. First of all, these support structures have some weight and occupy some volume and therefore decrease both the mass loading and the amount of fluid that can be carried. Further, additional parts, attach structures and weldments are necessary, all of which must be inspected and are subject to failure under vibration and acceleration loads which decrease the reliability of the system. Obviously, it would be desirable to eliminate the separate support structure, but it has heretofore not been found possible to do so and at the same time, retain the degree of control of the collapse of the three-lobed bladder that is necessary. In fact, in all such prior systems of which the inventor is aware, it is the support structure itself which defines the pattern of collapse of the bladder. According to this invention, however, I have devised a multi-lobed positive expulsion device which collapses in a predetermined pattern without any separate support structure, thereby avoiding all the inherent disadvantages of the support structures which are set forth above.

Accordingly, it is an object of this invention to provide a multi-lobed positive expulsion device which does not employ a separate support structure. It is a feature of this invention to form, integrally in the bladder portions having higher stiffness and resistance to collapse whereby the bladder itself performs the supporting functions otherwise performed by the separate internal support structure.

These and other objects and features of the invention will be readily apparent from the following description with reference to the accompanying drawing wherein:

FIG. 3 is an end view of the bladder of FIG. 2; and

FIG. 4 is the chem-mill pattern for varying the thickness of the bladder.

DESCRIPTION OF THE INVENTION

Figure 1:
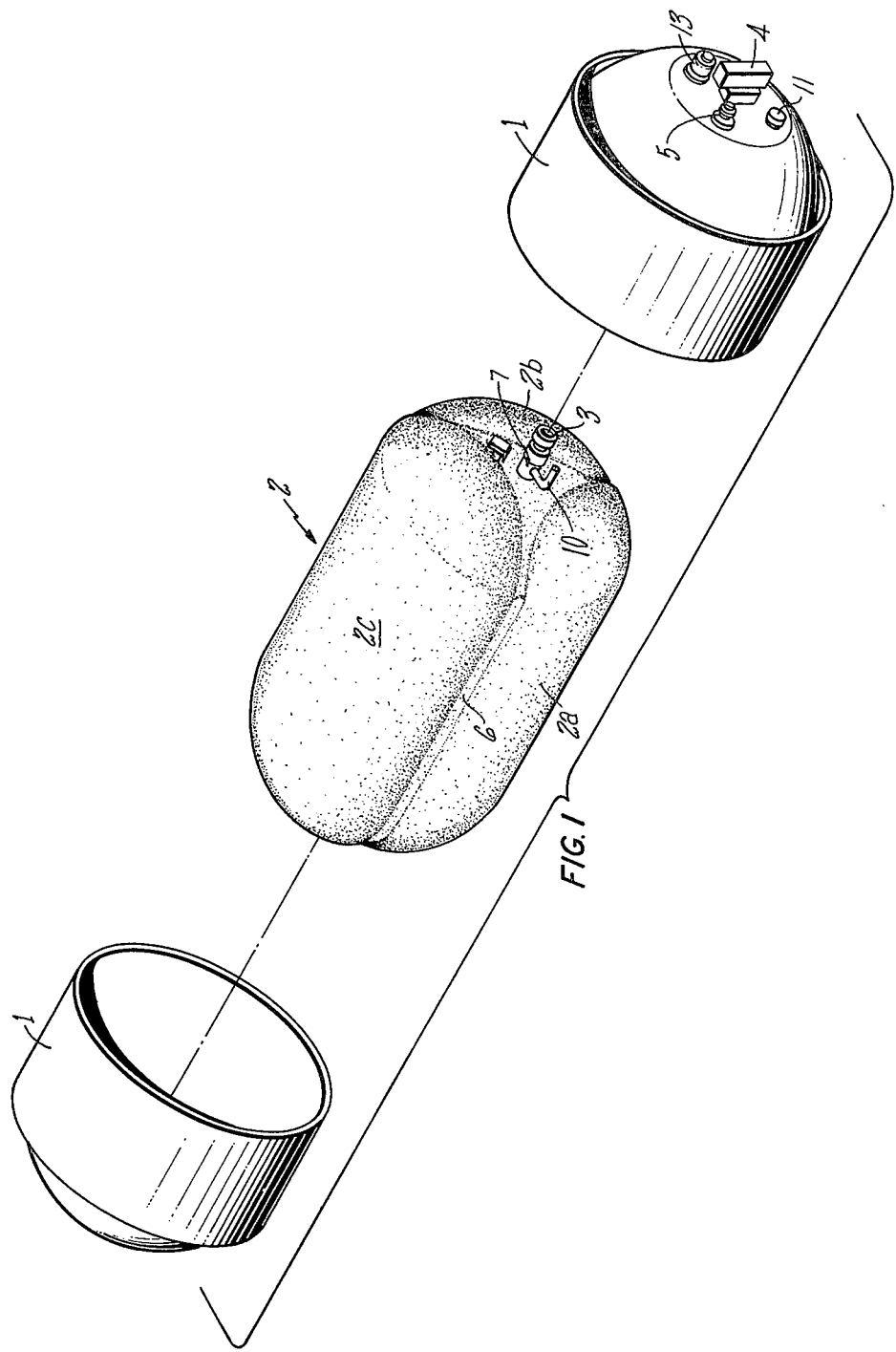
FIG. 1 is an exploded view of a positive expulsion device according to this invention.

Referring now to FIG. 1, a positive expulsion device, according to this invention, consists of a pressure vessel 1, which in the exploded view, is shown in two segments separated at the central weld which holds the segments together in normal operation, containing the bladder assembly 2, according to this invention. The bladder assembly is provided with an outlet tube 7, provided with fitting 3, which is adapted to be received within a suitable fitting, not shown in the end of vessel 1, such that the contents of the tank may be expelled through outlet fitting 4. The other end of pressure vessel 1 is provided with a support structure (also not shown) adapted to engage the end of tube portion 7a to support bladder 2 within the pressure vessel. Fitting 13 is provided on the pressure vessel to permit the introduction of the pressurizing medium, preferably a pressurized gas into the pressure vessel 1 around the outside of bladder 2 to cause the collapse of the bladder and the expulsion of its contents as is known to the art.

Figure 2:
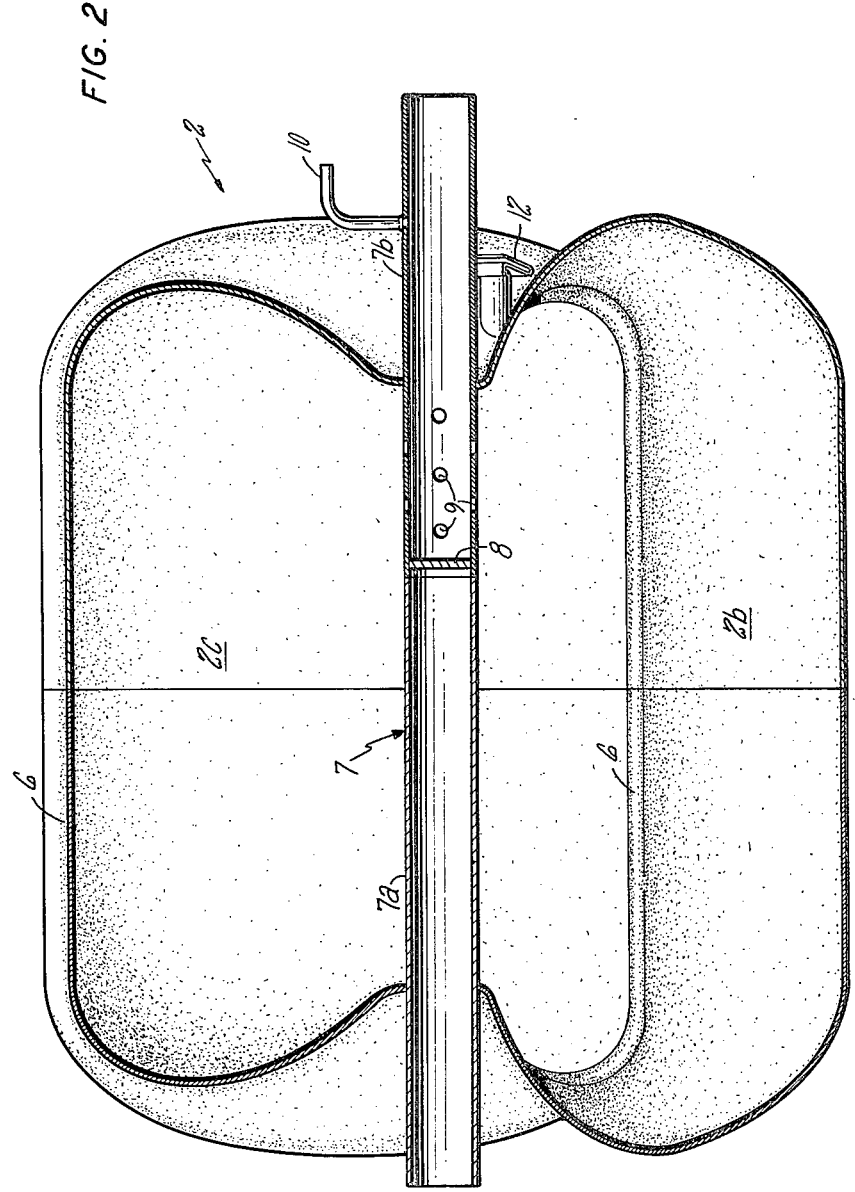
FIG. 2 is a side cross-section view of the bladder of FIG. 1.

A more detailed description of this invention is apparent from FIGS. 2 and 3. It should be recognized, however, that while this invention is being described with respect to the preferred, three-lobed embodiment of the invention, the invention is not limited to three-lobed devices and can be guided by appropriate design modifications to any number of collapsing lobes. The bladder 2, according to this invention, is fabricated from any suitable material having the desired characteristics of corrosion resistance and strength which are required for any particular design application. Suitable materials include, without limitation, aluminum, stainless steel and titanium, for example. While metals are preferred because of their physical and chemical properties, non-metalic materials could also be used if they can be tailored to have the necessary strength, corrosion resistance and imperviousness required according to this invention.

The bladder 2 is divided into a plurality, preferably 3, substantially identically configured lobes 2 (a), (b), and (c) by stiffening means 6 formed in the surface of bladder 2. In this embodiment the stiffening means 6 comprises equally spaced surface deformations of the cylindrical body portion and spherical end portions of the surface of the bladder 2. The actual shape of the stiffening means is not critical, although the semi-circular indentation shown is preferred. The end pattern, shown in some detail in FIG. 3 is selected such that the portions of the lobe on opposite sides of a plane running between adjacent stiffening means such as plane aa in FIG. 3 are, in the end zone portion of the bladder, substatially mirror images of each other. This permits the minimization of volume after collapse. Ideally, the surface 2aa will collapse inwardly and approach, as nearly as possible, the corresponding surfaces 2bb and 2cc in the other lobes to obtain the maximum expulsion efficiency.

Centrally mounted within bladder 2 is tube 7, which in the preferred embodiment of the invention, performs several functions. Tube 7 is divided into forward and rearward portions 7a and 7b by means of plug 8 which effectively isolates portion 7a from the contents of the bladder. Portion 7a extends beyond bladder 2 for sufficient distance to enable it to be mounted into a support structure on the inside of pressure vessel 1 to help support the bladder in the pressure vessel. The other portion of the tube 7b is provided, at that portion which is within bladder 2, with a series of holes 9 through which the contents of the bladder 2 can be caused to flow when the bladder collapses, forcing the contents of the bladder through outlet portion 7b. The outlet portion of tube 7b in turn fits into fitting 3 which is, in turn, received within the female portion of the conventional propellant isolation valve 4 which seals the assembly and retains the contents in the bladder until the valve 4 is explosively actuated permitting expulsion of its contents. In addition to providing the outlet means, tube portion 7b also provides additional support in a manner similar to 7a. The fill and drain tube 10 is connected to tube portion 7b which, in turn, mates with the fill and drain plug 11 on the pressure vessel. In addition, hot gas deflector means 12 are mounted on the bladder 2 at a point immediately behind the pressurizing valve 13, such that hot gas being introduced into the pressure vessel does not impinge directly upon the thin-walled bladder but, instead, is deflected and distributed more or less uniformly around the exterior of the bladder.

The function of the stiffening means 6 is to form a portion of the bladder which is more resistant to internal collapse than the rest of the bladder. In order to improve the likelihood for predictability of the initial collapse pattern, it is also desirable to weaken certain portions of the bladder assembly 2 to provide an area having the least resistance to collapse to permit the collapse of the bladder tube to occur in a predictable fashion at certain points. Referring now to FIG. 4, which is a top view of one of the lobes of the bladder of this invention, and which is representative of all of the lobes, a chemical milling pattern is shown in which the central portion 21, has been chem milled to the thinnest cross section, a surrounding portion 22 has been chem milled to a lesser degree with the surrounding portion 23 being the thickness of the original metal. This drawing shows two sections 21 being separated by a portion having the same thickness as portion 23. This gap was allowed to remain since it was at the weld line by which the two halves of the bladder were joined together in the fabrication process and it was considered undesirable to reduce the thickness at the weld to that of section 21; however, in other applications, it could be done.

In the manufacture of the bladder, it is preferable to fabricate the bladder in at least two segments, each segment having the desired end configuration. These two units could then be joined together at the center line to form the finished bladder as shown in FIG. 3. In some cases in which an extremely long bladder is desired, it may be feasible to join two end sections with one or more cylindrical sections to form a unit of greater length. When using metals as the bladder material, the bladders can be simply formed by spinning a cylindrical portion having an elliptical or hemispherical (hereinafter referred to for convenience as either "elliptical" or "ellipsoidal") end of the appropriate diameter and then explosively forming the end pattern and stiffening means in the spun bladder segment by use of an internal mandrel having the desired configuration. The two or more bladder segments can then be welded together and the internal support tube and associated structures welded into the assembly. The finished assembly can then be mounted within the two portions of the pressure vessel, which in turn, would be joined together. Once the assembly is completed, the empty bladder cannot be filled through fitting 3 and propellant isolation valve 4, since this is sealed. Instead, the contents of the bladder can be introduced into and, if necessary, removed from the bladder through fill and drain plug 11 communicating with fill and drain tube 10. In addition, as shown in FIG. 1, a leakage indicator 5 can be mounted on the pressure vessel in communication with the interior space between pressure vessel 1 and bladder 2 to monitor the occurrence of any leaks in the filled container.

The following example is given of an operational bladder assembly design for use as a zero gravity or high acceleration source of hydrazine fuel, it being understood that the following example is merely representative and not limiting of this invention.

A bladder 28.181 inches (71.58 cm) in diameter is fabricated from 0.036 inch (0.091 cm) 1100-0 aluminum with the overall tank length, exclusive of the tube 7 being 33.304 inches (84.59 cm). The cylindrical portion of the tank was 20.624 inches (56.38 cm). The distance from point "a" in the cylindrical portion of the tank to the center line of the stiffening groove 6 was approximately 1 inch (2.54 cm) uniformly curved from the convex to the concave. The overall length of the chem milled portion 21, was 16.6 inches (42.16 cm) and was milled to approximately 0.024 inch (0.061 cm) thickness. The overall length of portion 22, was approximately 22.6 inches (57.40 cm) and was milled to 0.030 (2.09 cm). The above design was utilized to cause expulsion of the contents upon a pressurization of $\Delta p$ of 3 pounds per square inch (0.02 atm).

While this invention has been described with respect to certain specific embodiments thereof, it should not be construed as being limited thereto.

Various modifications may be made by workers skilled in the art without departing from the scope of this invention which is limited only by the following claims wherein I claim:

1. A bladder structure, adapted to collapse under the application of a predetermined external pressure in a predictable fashion to permit expulsion of the contents of said bladder, said bladder comprising:
   a. Metallic bladder defining means having a predetermined resistance to inward collapse, said means being configured to have a cylindrical body portion and ellipsoidal end portions; and
   b. A plurality of uniformly spaced stiffening means formed integrally of said bladder defining means, said stiffening means having a higher resistance to internal collapse than the remaining portions of said bladder defining means, said stiffening means comprising externally concave deformations in the surface of said metallic bladder said deformations extending along said cylindrical body portions and into said ellipsoidal end portions.

2. The bladder of claim 1 wherein said stiffening means are substantially coextensive in length with said bladder defining means and divide said bladder defining means, including its ellipsoidal end portions, into a plurality of substantially identical lobes.

3. The bladder of claim 2 where the thickness of the wall of said bladder defining means between said stiffening means is decreased at predetermined substantially identical areas on each lobe.

4. The positive expulsion bladder of claims 1, 3 or 2 further comprising fluid communicating means mounted substantially centrally of said bladder to permit expulsion of the contents upon collapse of said bladder.

5. The positive expulsion device of claim 4 wherein said ellipsoidal end portions are hemispherical.

6. A positive expulsion device comprising:
   a. A pressure vessel; b. A metallic bladder structure received within said pressure vessel, said bladder structure being configured to have a cylindrical body portion and ellipsoidal end portions adapted to collapse under the application of a predetermined external pressure in a predictable fashion to permit expulsion of the contents of said bladder, said bladder structure comprising:
   i. Metallic bladder defining means having a predetermined resistance to inward collapse;
   ii. A plurality of uniformly spaced stiffening means formed integrally of said bladder defining means, said stiffening means having a higher resistance to internal collapse than the remaining portions of said bladder defining means, said stiffening means comprising externally concave deformations in the surface of said metallic bladder defining means said deformations extending along said cylindrical body portions and into said ellipsoidal end portions;
   c. Means for introducing a pressurizing medium between the interior of said pressure vessel and the exterior of said bladder; and
   d. Fluid communicating means extending from said bladder through said pressure vessel through which the contents of said bladder may be expelled upon collapse of said bladder.

7. The positive expulsion device of claim 6 wherein said stiffening means are substantially coextensive in length with said bladder, including said ellipsoidal end portions, and divide said bladder into a plurality of substantially identical lobes.

8. The positive expulsion device of claim 7 where the thickness of the wall of said bladder is decreased at predetermined substantially identical areas on each lobe.

9. The positive expulsion device of claim 8 wherein said fluid communicating means is mounted substantially centrally of said bladder.

10. The positive expulsion device of claim 8 wherein said ellipsoidal end portions are hemispherical.

11. The bladder structure of claim 1, 9, or 3 wherein said ellipsoidal end structures are hemispherical.

12. The positive expulsion device of claim 6 or 7 wherein the ellipsoidal end portions are hemispherical.

* * * * *